United States Patent [19]
Held

[11] Patent Number: 5,352,321
[45] Date of Patent: Oct. 4, 1994

[54] CONTINUOUSLY OPERATING DOUBLE BAND PRESS

[76] Inventor: Kurt Held, Alte Strasse 1, D-7218 Trossingen 2, Fed. Rep. of Germany

[21] Appl. No.: 60,792

[22] Filed: May 11, 1993

Related U.S. Application Data

[63] Continuation of Ser. No. 875,526, Apr. 27, 1992, abandoned, which is a continuation of Ser. No. 540,371, Jun. 19, 1990, abandoned.

[30] Foreign Application Priority Data

Jun. 29, 1989 [DE] Fed. Rep. of Germany ....... 3921364

[51] Int. Cl.$^5$ ................................................ B30B 5/06
[52] U.S. Cl. ...................................... 156/498; 156/555; 156/583.5; 100/154; 425/371; 219/243; 165/27
[58] Field of Search ............... 156/282, 311, 498, 555, 156/580, 583.1, 583.5; 100/93 RP, 151, 154; 165/27, 32, 61, 168; 425/224, 371; 198/626.6, 841, 952; 219/243, 244, 469, 470, 471, 549

[56] References Cited

U.S. PATENT DOCUMENTS

| | | | |
|---|---|---|---|
| 4,064,299 | 12/1977 | Martin | 100/151 X |
| 4,365,548 | 12/1982 | Pankoke | 156/583.5 X |
| 4,541,889 | 9/1985 | Held | 156/583.5 |
| 4,560,431 | 12/1985 | Inselmann | 156/555 X |
| 4,670,080 | 6/1987 | Schwarz et al. | 156/583.5 X |
| 4,723,484 | 2/1988 | Held | 100/154 X |
| 4,804,039 | 2/1989 | Schafer | 165/2 |
| 4,964,943 | 10/1990 | Kruger et al. | 156/498 |
| 5,034,087 | 7/1991 | Denker et al. | 156/555 |

FOREIGN PATENT DOCUMENTS

| | | |
|---|---|---|
| 0245762 | 11/1987 | European Pat. Off. . |
| 0291756 | 5/1988 | European Pat. Off. . |
| 0292738 | 11/1988 | European Pat. Off. . |
| 853402 | 8/1951 | Fed. Rep. of Germany . |
| 2421296 | 11/1975 | Fed. Rep. of Germany . |
| 3028145 | 2/1982 | Fed. Rep. of Germany . |
| 0131879 | 7/1984 | Fed. Rep. of Germany . |
| 3325578 | 1/1985 | Fed. Rep. of Germany . |
| 3709958 | 10/1988 | Fed. Rep. of Germany . |
| 3717649 | 12/1988 | Fed. Rep. of Germany . |

Primary Examiner—David A. Simmons
Assistant Examiner—J. Sells
Attorney, Agent, or Firm—Klaus J. Bach

[57] ABSTRACT

The invention is directed to a continuously operating double band press for fabrication of laminates, chip,- or fiberboard, plywood or the like. The double band press comprises an upper and a lower endless press band conducted over respectively two reversing drums rotatably supported in a rigid press stand. Pressure chambers are arranged on the inner sides of the press bands, which are bounded in a vertical direction by a pressure plate fastened in the press stand and the press band and in a horizontal direction by floating seals. A pressure generated by fluid agents acts in the pressure chambers upon the press bands. Heat-conducting elements are arranged in the pressure chamber for heating or cooling the press bands. These heat-conducting elements comprise a body in which means for heating or cooling the heat-conducting elements are provided.

28 Claims, 7 Drawing Sheets

CONTINUOUSLY OPERATING DOUBLE BAND PRESS

The present application is a continuation application of Ser. No. 07/875,526 filed Apr. 27, 1992, abandoned, which is a continuation application of Ser. No. 07/540,371 filed Jun. 19, 1990 abandoned.

The invention is directed to a continuously operating double band press for fabrication of laminates, chipboard fiberboard, plywood or the like.

BACKGROUND OF THE INVENTION

Double band presses (DE-OS 24 21 296) serve for continuous fabrication of endless web-shaped materials, especially for production of decorative layered material laminates, copper-coated electrolaminates, thermoplast webs, chipboards, fiberboards and the like. These double band presses have two endlessly revolving press bands, in between which the material web is cured with application of pressure and possibly also heat and simultaneous conveyance in the feed direction. For generation of the pressure acting upon the material web, the so-called isobaric machines of this species are equipped with pressure chambers, which are bounded by a pressure plate and the press band in the vertical direction and on the sides by sliding face or floating seals. The pressure is built up in these pressure chambers by fluid pressure agents, such as oil or compressed air. So as to supply heat to the commodity being pressed, it is known to design the reversing drums on the inlet side of the double band press so that they can be heated. This heats the press bands of the double band press when travelling over the heated reversing drums. Then the press bands convey the quantity of heat thus picked up into the region where the commodity to be pressed lying between the two press bands is subjected to area pressure, the so-called reaction zone, and they yield there their heat to the commodity to be pressed. Because of the limited heat capacity of the press bands this quantity of heat however in many cases is insufficient.

Elements conducting heat have become known from the DE-OS 33 25 578 by means of which additional heat can be transferred to the press bands in the region of the reaction zone. These elements conducting heat consist of a material with good heat conductivity and are arranged at the pressure plate in the double band press having a surface assuring good heat conduction contact. The other surface of the heat-conducting elements contact the inner sides of the press bands in the region of the reaction zone in a dragging manner. The pressure plates are heated to a higher temperature than the specified temperature of the reaction zone, so that a heat gradient is provided between the pressure plates and the press bands and a heat flow is directed from a pressure plate through the heat-conducting elements onto the press band. This additional heat is transmitted by the press band then to the commodity being pressed. With such an arrangement a cooling of the press bands is also possible, by cooling the pressure plate.

In order to heat the pressure plates in a double band press it is further known from the DE-OS 24 21 296 to machine channels configured as bores into the pressure plate through which a heated fluid medium flows. If the pressure plate is to be cooled then a cooled fluid medium is directed through these bores. Gases or vapors but also liquids such as thermal oil or cooling liquids are suitable to be used as fluid media. Water can for instance also be used as a cooling liquid. Such fluid media for heating or cooling the pressure plate are hereinafter referred to as "heat carrier agents".

A disadvantage in the known heat-conducting elements is that the heat transfer occurs from the heat carrier agent flowing in the bores of the pressure plate onto the pressure plate, from the pressure plate to the heat-conducting element, and from the heat-conducting element finally to the press band. Each individual heat transfer results in a diminution of the effective heat-conducting capacity. The considerable travel from the bore in the pressure plate up to the press band leads also to a limitation of the heat flow. In some application cases the maximum heat transmitted by means of the heat-conducting elements is insufficient.

SUMMARY OF THE INVENTION

The invention has as its main object to further develop the heat-conducting elements in the pressure pad of the double band press in such a way that an improved thermal conductivity is achieved and because of this a greater quantity of heat is transmitted to the press band in the region of the reaction zone.

This object is achieved, in accordance with the invention, briefly speaking, by providing heat-conducting elements in the pressure chambers with a body provided with means for heating or cooling the body. Preferably, the heat-conducting elements in the invention can be particularly expediently arranged at the transition from the heating into the cooling zone along the press bands. By this means, the band is mechanically supported at this point and the danger of a buckling of the band as a consequence of heat expansion or contraction due to the large temperature differences in the heating and cooling zones are thus effectively eliminated.

The advantages achievable by the invention consists particularly in that the heat transfer in the known apparatus from the bores to the pressure plate and from the pressure plate to the heat-conducting element is eliminated and the heat flow to the press band thus traverses the shortest possible path. Viewed overall this permits the transfer of a considerably larger quantity of heat to the commodity being pressed in the reaction zone and to remove it from the commodity being pressed in the reaction zone, than was possible hitherto in the state of the art.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention.

DETAILED DESCRIPTION OF THE PREFERRED EMBODIMENTS

Figure 1:
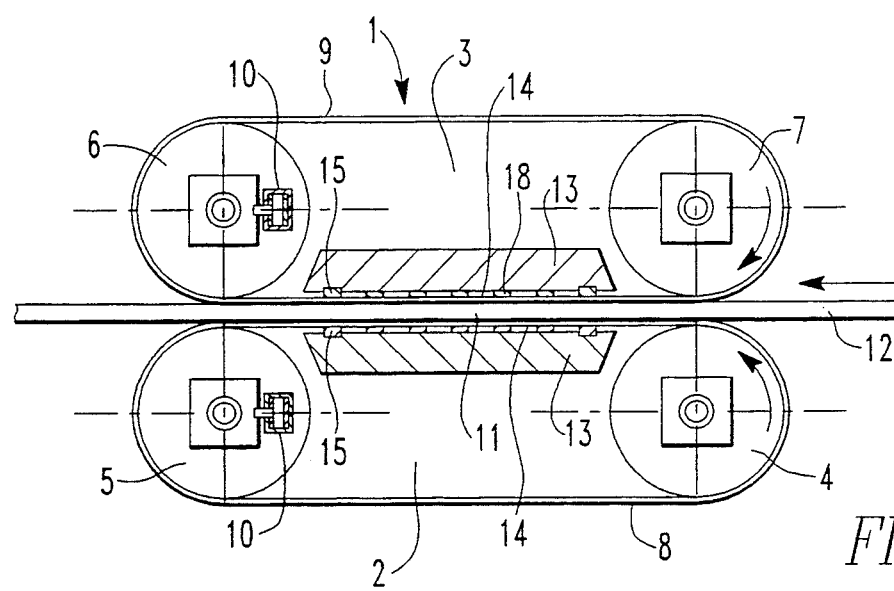
FIG. 1 is a diagrammatic view of one form of a double band press in accordance with the invention in a sectional and side view.

The continuously working double band press 1 depicted in FIG. 1 comprises a lower press band unit 2 and an upper press band unit 3, which are arranged one above the other. The press band units 2, 3 are composed of two reversing drums 4, 5 or 6, 7 each and one each endless press band 8, 9. The press band 8, 9 normally consisting of high tensile steel is wrapped around the reversing drums 4,5 or 6, 7 and stretched by means of a hydraulic cylinder 10. The four reversing drums 4, 5, 6, 7 are rotatably supported in a press stand not shown in the drawing for reasons of clarity. At least one reversing drum of each press band unit 2, 3 is driven by a motor, so that the two press bands 8, 9 move in accordance with the arrows in the reversing drums 4, 7. The reaction zone 11 is located between the lower band segment of the upper press band 9 and the upper band segment of the lower press band 8; the material web 12 advancing in the drawing from the righthand side to the lefthand side is pressed or extruded in the reaction zone 11 with the application of area pressure and heat during its passage through the double band press 1.

The material web 12 can for instance consist of fabric, laminates, fiber-binder mixtures, thermoplast webs and the like impregnated with synthetic resin. In the present embodiment example we are dealing as far as the material web 12 is concerned with individual glass fiber fabric webs stacked one of the other to form a layered formation, which are impregnated with epoxy resin, and additionally with copper foil web plates upon the surfaces of the layered or laminate formation; they are then extruded in a double band press into a copper coated laminate web. Such a copper coated laminate serves as initial material for the fabrication of printed circuit boards.

Pressure plates 13 are arranged in the press band of the double band press 1 for generating the area pressure acting upon the material web 12 in the reaction zone 11, from which pressure plate the pressure is applied hydraulically upon the inner side of the press bands 8, 9 and then transferred by these to the material web 12. In case of hydraulic pressure transmittal, a fluid pressure medium capable of being pressurized is introduced into the space between the pressure plate 13 and the inner side of the press band 8, 9. This space, the so-called pressure chamber 14, is bounded on the side by a floating seal 15 sliding upon the inner side of the press band 8, 9 and fastened in the pressure plate 13; this floating seal is a continuous annularly-shaped seal. Synthetic oil is preferably used as a pressure medium. A gas, for instance compressed air, can however be utilized equally well.

Figure 3:
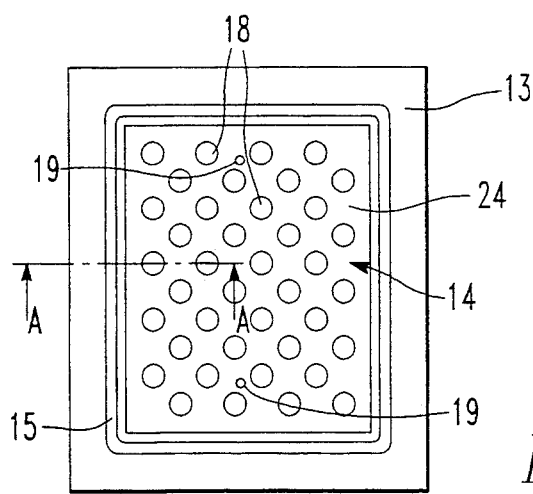
FIG. 3 is a plan view of a pressure plate used in the FIG. 1 embodiment from the inner side of the press band.

Inlet apertures 19 discernible in FIG. 3 are located in the pressure plate 13 for supply of the pressure agent into the pressure chamber 14.

Figure 4:
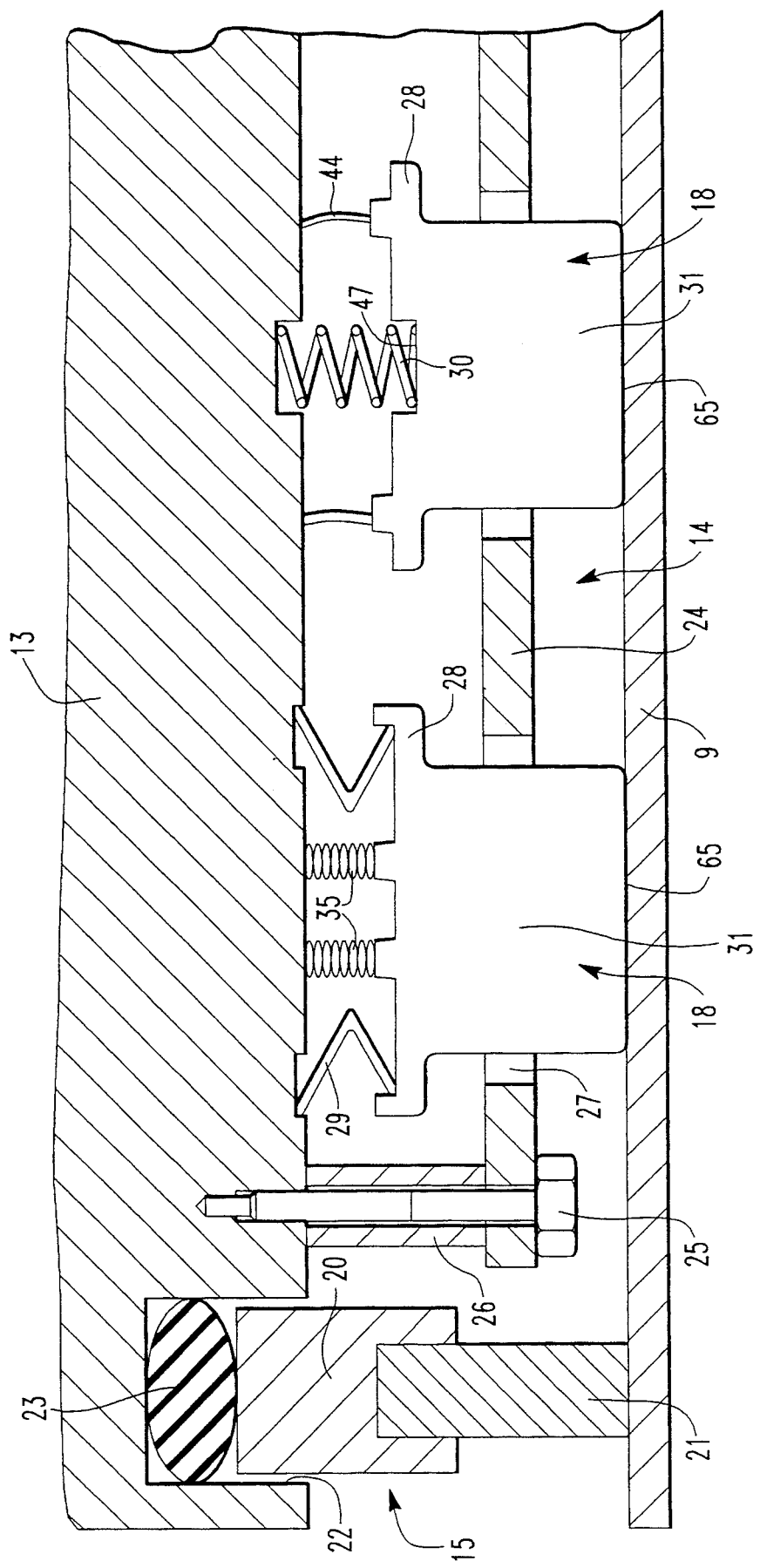
FIG. 4 is a cross-sectional view along the line A—A in FIG. 3.

The floating seal 15 consists, as shown in detail in FIG. 4, of a U-shaped retaining strip 20, where the sealing member 21 proper is fastened. The U-shaped retaining strip 20 is arranged in a groove 22 of the pressure plate 13 and is acted upon by a pressure agent from the base of the groove, so that the sealing member 21 is pressed against the moving press band 8, 9 and thus seals the pressure chamber 14 against the atmosphere. An O-ring 23 rests in the groove 22 against the U-shaped retaining strip 20, which again seals the groove 22 against the atmosphere.

The reversing drums 4, 7 at the inlet can be designed to be heatable so as to transfer heat to the material web 12 in the reaction zone 11. As can be discerned in detail in FIG. 2, bores 17 are placed into the jacket 16 of the cylinder-shaped reversing drums 4, 7, through which flows a heat carrier agent. The heat of the reversing drums 4, 7 at the inlet is then transferred onto the press bands 8, 9 which convey the quantity of heat thus received into the reaction zone 11 and yield it there to the material web 12. Because of the limited heat capacity of the press bands 8, 9 the quantity of heat transported thus into the reaction zone 11 is in many cases insufficient for curing the material web 12. By way of a supplement or as an alternative to the heating of the reversing drums 4, 7 on the inlet, heat-conducting elements 18 are arranged in the pressure plate 13, by means of which additional heat can be transmitted in the reaction zone 11 to the press band 8, 9.

With these heat-conducting elements it is alternatively also possible to cool the press band 8, 9 and with them the material web 12 in the reaction zone 11.

The arrangement of the heat-conducting elements 18 in the pressure chamber 14 is shown in FIG. 3. The heat-conducting elements 18 have a circular base and are arranged next to each other in rows, which extend across the width of the pressure chamber 14. The heat-conducting elements 18 are arranged to be offset against each other in two adjacent rows, so that overall a uniform cooling or heating of the entire surface of the press band results.

As can additionally be gathered from FIG. 4, a guide plate 24 is arranged inside the pressure chamber 14 parallel to the pressure plate 13, which has a specific spacing from the pressure plate 13 as well as from the press band 8, 9. The guide plate 24 is fastened to the pressure plate 13 by means of bolts 25 and spacer sleeves 26 and has round throughholes 27 at the spots where the heat-conducting elements 18 are arranged, whose diameter is somewhat larger than that of the heat-conducting elements 18. The body member 31 of the heat-conducting elements 18 has a cylindrical shape, with an edge 28 extending circumferentially at one side of the member 31, wherein the outer diameter of the edge 28 is larger than the diameter of the throughhole 27. The heat conducting elements 18 are inserted into the throughholes 27 of the guide plate 24 in such a way that the edge 28 is facing the pressure plate 13. This prevents the heat-conducting elements 18 from falling out of the pressure chamber 14 in case a press band 8, 9 is replaced.

Springs 29, 30 are located between the pressure plate 13 and the side of the heat-conducting elements 18 facing the pressure plates, which springs are fastened with one end to the pressure plate 13 and with the other end at the body member 31 of the heat-conducting element 18. The heat-conducting elements 18 are made to contact with one face 65 the press band 8, 9 by means of the pressure of the spring 29, 30; the press band slides along this surface 65 of the heat-conducting elements 18 during operation of the double band press 1. Because of the contact pressure of the spring 29, 30 the heat-conducting element 18 is provided with a good heat-conducting contact to the press band 8, 9. Two versions of the spring elements can be seen in FIG. 4. In the heat conducting element 18 appearing on the lefthand side of FIG. 4 a leaf spring 29 is shown and in case of the heat-conducting element 18 appearing on the righthand side of FIG. 4 a helical spring 30 is shown. If desired the springs 29, 30 can be welded or soldered at the member 31 of the heat-conducting element.

Means for heating or cooling are arranged in the body 31 of the heat-conducting element 18 in accordance with the invention, so that the heat produced in the heat-conducting element 18 is transferred directly to the press band 8, 9 or that the heat from the press band 8, 9 is received in the heat-conducting element 18 and is directly carried away from there when cooling. Because of the good heat transfer contact between the face 65 of the heat-conducting element 18 resting against the press band 8, 9 and the press band 8, 9 as well as the short travel of the heat flow between the material web 12 and the heat-conducting element 18, there exists a small thermal resistance, so that the heating or cooling of the material web 12 is achieved with the best possible efficiency.

Several versions of the heat-conducting elements will be described below with the help of FIGS. 5 to 9.

Figure 5:
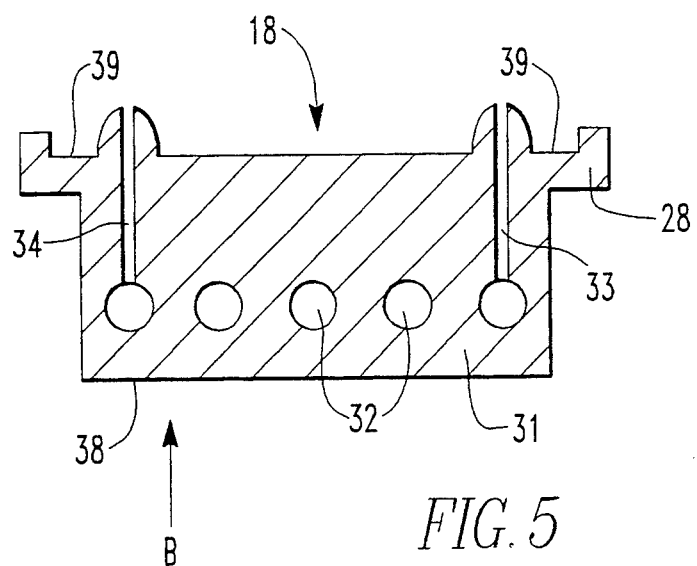
FIG. 5 is a cross-sectional view through a heat-conducting element of FIG. 4.

The heat-conducting element shown in FIG. 5 comprises a compact cylindrical body 31 with an edge 28 added on the one side. Several bores 32 connected with each other are drilled in the cylindrical body 31. The bores 32 are on their part connected with a supply line 33 and an outlet line 34, which extends up to the surface of the cylindrical body in the vicinity of the edge 28. The supply line 33 and the outlet line 34 are connected with corresponding supply lines in the pressure plate 13 by means of a flexible bellows 35 (see FIG. 4). Receiving faces 39 for contact with the leaf spring 29 are configured between the edge 28 and the supply line 33 or the outlet line 34.

The heat carrier agent flows through the supply lines in the pressure plate 13 through the line 33 into the cylindrical member 31, then flows through the bores 32 and is subsequently again carried away through the outlet line 34. This heats the cylindrical member 31 of the heat-conducting element 18 and this heat is then imparted to the press band 8, 9 from the member 31 through the surface 38 facing the press band 8, 9. Thermal oil is for instance suitable as a heated heat carrier agent. The press band 8, 9 can also be cooled by means of the arrangement shown here by conducting a cooled heat carrier agent through the bores 32. Water or mercury can be used as a cooled heat carrier agent.

Figure 6:
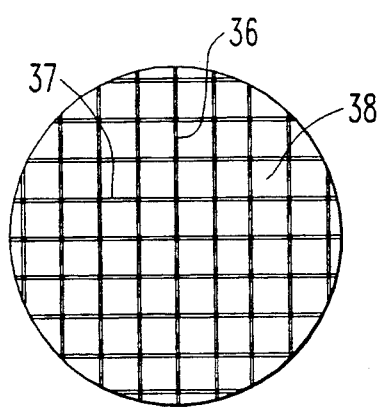
FIG. 6 is a plan view of the heat-conducting element of FIG. 5 taken from direction B in FIG. 5, FIGS. 7–9 are cross-sectional views through alternative forms of heat-conducting elements.

The face 38 of the cylindrical member 31 facing the press band 8, 9 is shown in more detail in front view in FIG. 6 from the direction B in FIG. 5. Horizontally extending first flutes 36 and horizontally extending second flutes 37 extend transversely of one another are placed at uniform spacings into this face 38. The flutes 36 and 37 cross to form a grid covering the surface. These flutes 36 and 37 form channels for the pressure agent located in the pressure chamber 14, so that the pressure agent penetrates in between the surface 38 of the cylindrical member 31 facing the press band 8, 9 and the surface of the press band 8, 9 and thus exerts simultaneously a lubricating effect on the press band 8, 9 sliding along the surface 38.

In order further to improve the heat transfer between the heat carrier agent flowing in the bores 32 and the heat-conducting element 18 and thus further to increase the effectiveness of the heat-conducting element 18, the bores 32 can also be equipped with surface increasing inserts. Such surface increasing inserts can be designed in accordance with DE-OS 37 17 649 and thus do not require further description at this time. Another possibility to increase the surface of bores 32 consists in placing ribs into these bores.

Figure 7:
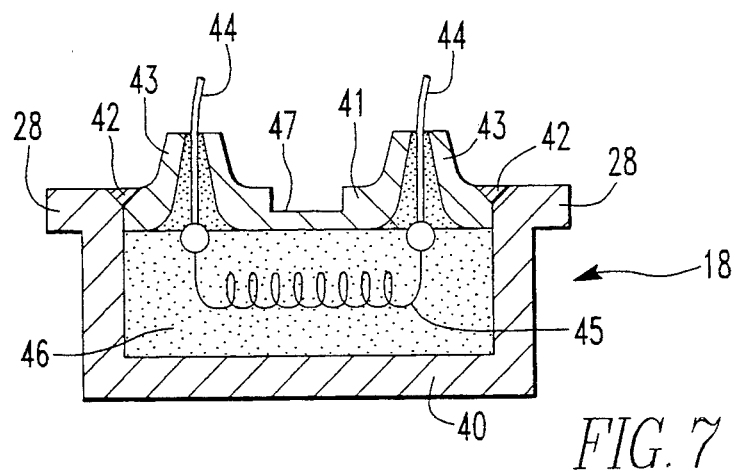

Another version of the heat-conducting element 18 can be seen in FIG. 7. Here the body consists of a cylindrically-shaped, hollow housing 40 open on one side. The housing 40 comprises an edge 28 placed at the open side. A cover 41 is furthermore arranged at the open side of the housing 40, which is connected with the housing 40 by soldering or welding seams 42. The receiving surface 47 for the helical springs 30 is machined in the cover 41 (in this connection see also FIG. 4). The cover 41 comprises furthermore two passages 43 for electrical connections 44. A heating coil 45 is arranged in the housing 40, which again is connected with the electrical supply lines 44 extending into the housing 40. The inside of the housing 40 is filled with a ceramic mass 46 which is electrically insulating but has good heat conductivity, so that the heating coil 45 is completely embedded into the ceramic mass 46. The passages 43, where the electrical supply lines 44 are located, are also filled by an electrically insulating mass. This electrically insulating mass can again be ceramic or glass. Since all current carrying parts 44 and 45 are embedded into an electrically insulating mass, the danger of short-circuits with the housing 40 or the cover 41 is effectively eliminated. The electrical connections 44 are again coupled with appropriate current conducting lines in the pressure plate 13 (see FIG. 4). The electrical supply lines 44 in the pressure chamber 14 can for protection also be surrounded by flexible bellows 35.

If voltage is applied to the electrical lines of the respective heat conducting element 18, then electric current flows through the line 44 into the heating coil 45 and heats same. The heat is transferred through the ceramic mass 46 to the housing 40 of the heat-conducting element 18 and is further conveyed by same to the press band 8, 9. It is particularly advantageous in this version that these heat-conducting elements 18 can be heated to higher temperatures than those described in the version in FIG. 5, since most heat carrier agents are stable only up to a specific temperature range. Another advantage is that the heating output of the heat-conducting elements 18 can be easily regulated by the electric current. In addition, the heating as required is possible by switching the heat-conducting elements 18 on and off as required.

The housing 40 and the cover 41 can for instance consist of copper, which has good heat conductivity. Bronze is also suitable as material for these parts. It is however also possible to fabricate the housing of steel by deep drawing and to subsequently copperplate the parts. Corresponding materials can also be used for the cylindrical member 31 of the heat-conducting element in the embodiment described in FIG. 5.

Figure 8:
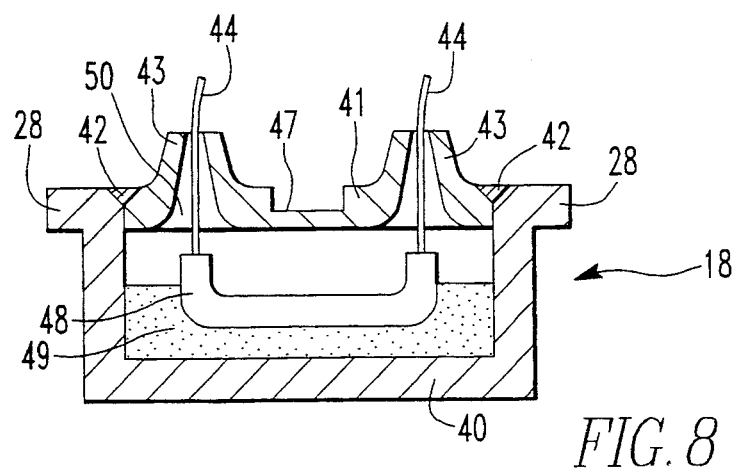

An electrically heatable heat-conducting element 18 can be seen in another version in FIG. 8. The body consists again of a housing 40 and a cover 41 as in the heat-conducting element 18 shown in FIG. 7. A tubular heating body 48 is arranged in the housing 40. This tubular heating member is connected with the inner walls and the base of the housing 40 by means of braising solder 49 which has a high heat conductivity. The electrical connection 44 is insulated in the passages 43 by means of a vitreous mass 50. This vitreous mass serves simultaneously as a block in order to prevent penetration of the pressure agent located in the pressure chamber 14 into the housing 40.

Figure 9:
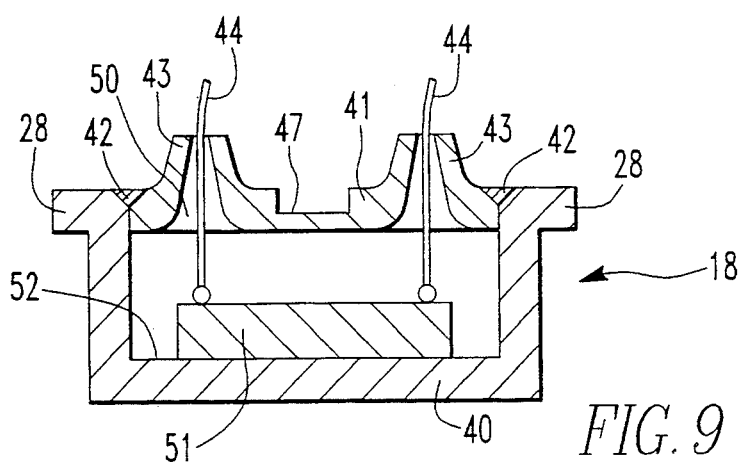

FIG. 9 shows an electrically operated heat-conducting element 18, serving for cooling the press band 8, 9 and with it the material web 12 in the reaction zone 11. This heat-conducting element, which is designed like that in FIG. 8, has however a Peltier-cell 51 instead of a tubular heating member, which cell is arranged in the housing 40. This Peltier-cell 51 rests with one face at the base surface 52 of the housing 40 and is connected with the electrical lines 44; if the heat-conducting element 18 is switched on, current flows through the Peltier cell 51 and cools herein the base 52 and the housing 40. This removes heat from the press band 8, 9 as well as the material web 12 and these are thus cooled.

In the versions in FIGS. 5 to 9, the heat-conducting elements 18 have a cylindrical body. The bodies of the heat-conducting elements 18 can however also have other suitable shapes. For instance the body of the heat-conducting elements can be designed as a square block or be prismatically-shaped. The throughholes 27 in the guide plates 24 (see FIG. 4) then have a somewhat larger cross-section than the members of the heat-conducting elements 18. The circumferential ledge located at the member at the side of the heat-conducting element 18 facing the pressure plate 13 is again somewhat larger than the aperture of the throughhole 27, so that the heat-conducting element 18 is prevented from falling out of the guide plate. In particular such square-shaped or prismatic heat-conducting elements can also extend across the entire width of the pressure chamber 14.

The pressure plate 13 can in addition also be heated or cooled in order to avoid an undesirable heat flow between the pressure plate 13 and the heat-conducting elements 18. This can be done with means known as such, by providing the pressure plate 13 with bores, through which a heated or cooled heat-carrier agent flows.

The heat-conducting elements of the invention can be utilized to particular advantage also in the transition zone between two pressure plates, wherein one pressure plate is configured as a heating plate and the other pressure plate as a cooling plate.

Figure 10:
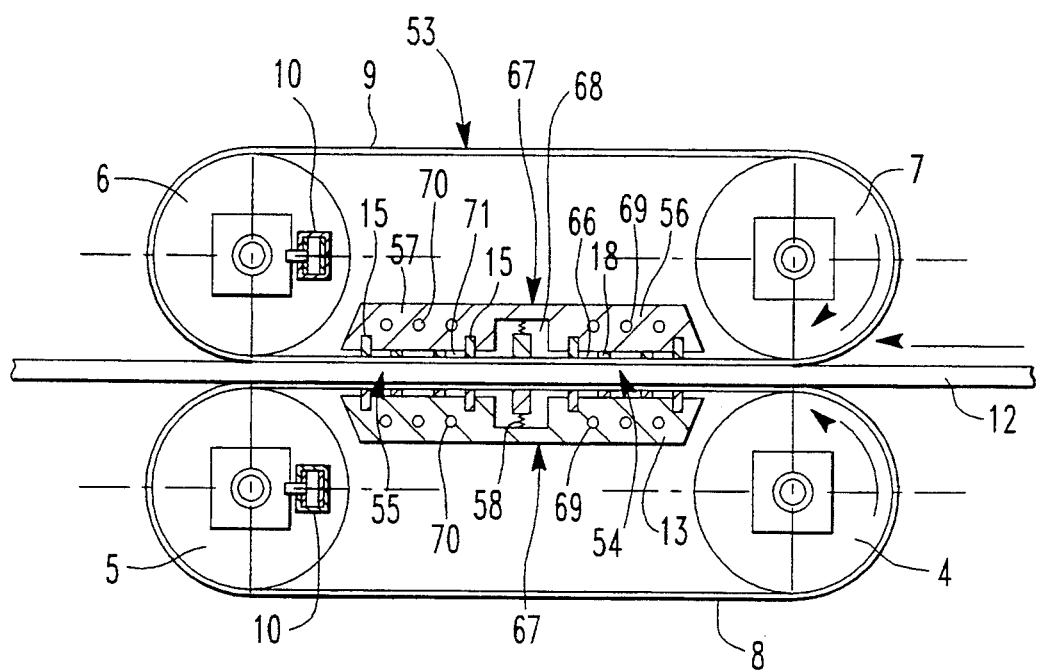
FIG. 10 is a diagrammatic view of a section from a side view of a double band press in accordance with the invention with a heating and cooling zone.

FIG. 10 shows a double band press 53 equipped with such a pressure plate 67, which has a heating zone 54 assigned to the inlet and a cooling zone 55 assigned to the outlet. The pressure plate 67 of the double band press 53 is divided into a heating plate 56 and a cooling plate 57, wherein the heating plate 56 comprises bores 69 for passage of a heated heat carrier agent and the cooling plate 57 comprises bores 70 for a cooled heat transfer agent. Floating seals closed annularly within themselves forming the sidewise boundary of two separate chambers 66, 71 are arranged in heating plate 56 as well as in the cooling plate 57. Heat-conducting elements 18 according to the invention for heating the press bands 8,9 are arranged in the pressure chamber 66 of the heating plate 56. Additional inventive heat-conducting elements 18 for cooling the press bands 8, 9 are arranged in the pressure chamber 71 of the cooling plate 57. By way of a supplement or alternatively to this, conventional heat-conducting elements can also exist in the pressure chambers 66, 71, which are designed in accordance with DE-OS 33 25 578. By means of the heat-conducting elements in the invention or of the conventional ones, the material web 12 is then heated in the heating zone 54 and subsequently cooled in the cooling zone 55.

Considerable temperature gradients arise in the transitional zone between the heating zone 54 and the cooling zone 55, which result in differing thermal expansions or contractions in the press bands 8, 9. These thermal expansions or contractions cause again stresses in the press bands 8, 9, which can lead to bulging or buckling of the press bands 8, 9 with damage resulting therefrom, at least however they can result in the impairment of the useful life of the press bands 8, 9. Additionally, marks can appear thereby in the surface of the material web 12. Surprisingly, it was seen that a reduction of these stresses is possible when using heat-conducting elements according to the invention, which are arranged in the transition zone between the heating zone 54 and the cooling zone 55.

Figure 11:
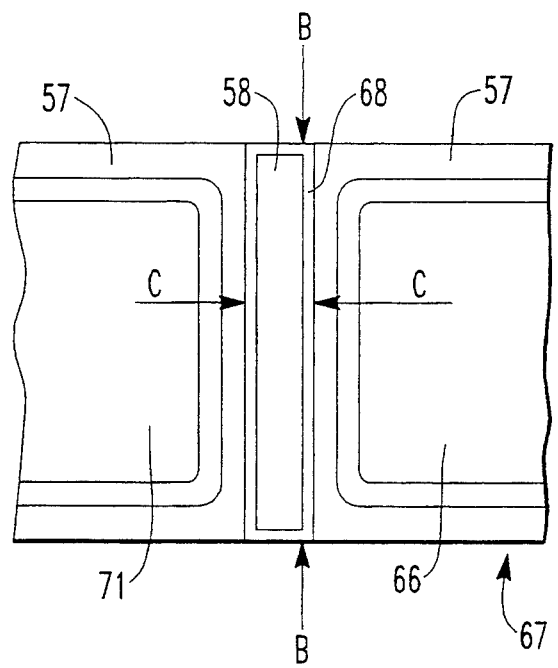
FIG. 11 is a front view of a pressure plate in the FIG. 10 embodiment taken in the transition zone between the heating and cooling zone viewed from the inner side of the press band.
Figure 12:
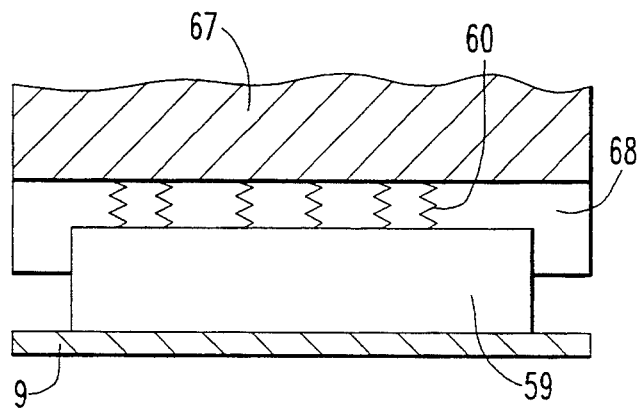
FIG. 12 is a cross-sectional view along the line B—B in FIG. 11.
Figure 13:
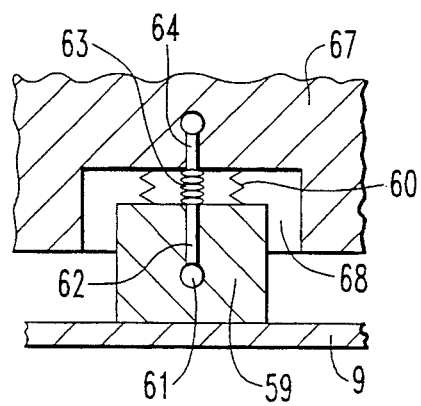
FIG. 13 is a cross-sectional view along the line C—C in FIG. 11.

An embodiment of a heat-conducting element 58 serving for reducing of stresses in the press band can be seen in FIGS. 11 to 13. The heat-conducting element 58 is located in a groove 68 in the pressure plate 67 arranged at the transition between the heating plate 56 and a cooling plate 57. It has a square block or rod-shaped face, holohedral body 59 consisting of a material having good thermal conductivity, for instance copper. The length of the square-shaped body lies between the width of the pressure chamber 66, 71 and the width of the press bands 8, 9 as can be gathered from FIGS. 11 and 12. The member 59 is made to contact the press bands 8, 9 by means of spring elements 60 which abut in the groove 68 of the pressure plate 67.

As is shown in FIG. 13, at least one bore 61 extending in the longitudinal direction of the rod is located in the body 59, which bore can be supplied with a heat carrier agent through the supply channels 62. The supply lines 62 are again connected to feed lines 64 in the pressure plate 67 by means of a flexible bellows 63. The heat carrier means is directed to the bore 61 through this feed line 64 in the pressure plate 67 and the supply line 62. Herein we are dealing with a heated or cooled heat carrier agent according to the respective requirements, so that said agent heats or cools the body 59. Thereby the press band 8, 9 is also either heated or cooled in the region of the groove 68, meaning in the transition zone between the heating zone 54 and the cooling zone 55.

By appropriately selecting the temperature of the heat-conducting element 58 and the contact pressure of the body 59 against the press band 8, 9 by means of the spring element 60, it is achieved that the press band 8, 9 is retained to be level in the transition zone between the heating zone 54 and the cooling zone 55. This eliminates the tendency of the press band 8, 9 to bulge or buckle in the transition region mainly because of the different thermal expansions in the heating zone 54 and the cooling zone 55. Apart from that, the stresses arising in the transition zone in the press band 8, 9 are also reduced. In some circumstances it could even be sufficient if the heat-conducting element 58 is neither heated nor cooled, rather it is made to contact the press band 8, 9 by means of the spring element 60, in order to already achieve an effective reduction of the stresses in the transition zone.

Figure 14:
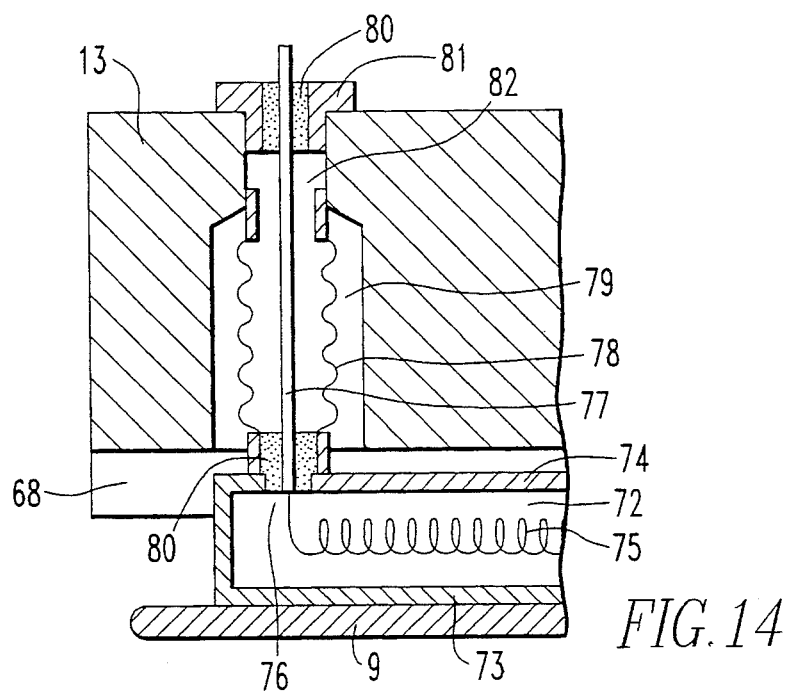
FIG. 14 is a longitudinal section through a heat-conducting element in the transition zone in accordance with another variation.

It will be evident that the heat conducting elements 58 arranged in the transition zone between the heating zone 54 and the cooling zone 55 can be heated by electric heating elements or cooled by means of Peltier cells, as has already been explained previously when dealing with the other embodiments of the heat-conducting elements 18. Such a rod-shaped heat-conducting element 72 located in the transition zone can be seen in FIG. 14 which element is electrically heated by means of a heating coil.

The heat-conducting element 72 comprises a housing 73 which is hollow on the inside and which is closed by a cover 74. The heating coil 75 is arranged inside the housing 73. The heating coil 75 can again be embedded in a ceramic mass having a good thermal conductivity. The connecting wires 77 of the heating coil 75 are passed through a passage 76 located in the cover 74 and it is furthermore conducted inside of a bellows 78. The bellows 78 is fastened on one end at the cover 74 near the passage 76. The passage 76 can itself again be filled by a vitreous mass 80 for purposes of electric insulation. The bellows 78 extends in a groove 79 in the pressure plate 13 and is fastened with its other end in the groove 79 at the side of the pressure plate 13 facing away from the press band 8, 9. The groove 79 opens out into a bore 82 at the side facing away from the press band 8, 9, which bore passes through the pressure plate 13. The bore 82 is sealed by a plug 81, through which again the junction wire 77 passes sealed by means of a vitreous mass 80. The junction wire 77 is then connected to the voltage source located externally of the pressure plate. The bellows 78 serves for protection and sealing of the junction wire 77.

Figure 15:
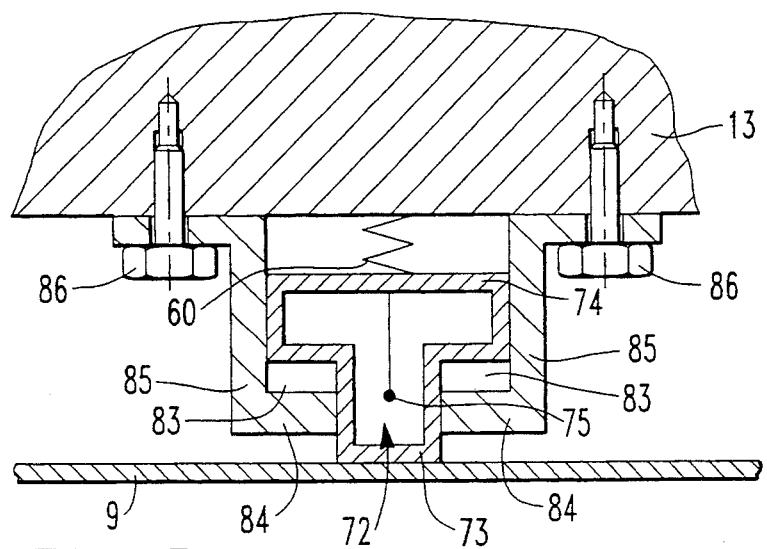
FIG. 15 is a cross-sectional view taken in the lateral direction through another variation of a heat-conducting element in the transition zone.

The retention and guidance of the heat conducting element 72 can be seen in more detail in FIG. 15. The heat-conducting element 72 has an indentation 83 on each side on the side facing the press band 8, 9. The lug 84 of an S-shaped mounting 85 engages into this indentation 83. The other end of the S-shaped mounting 85 is fastened to the pressure plate 13 by means of bolts 86. The heat-conducting element 72 is guided by the lugs 84. The indentation 83 takes care of the freedom of motion of the heat-conducting element 72 in the vertical direction, so that it can be made to contact the press band 8, 9 by means of the spring elements 60 in all operational states.

Figure 2:
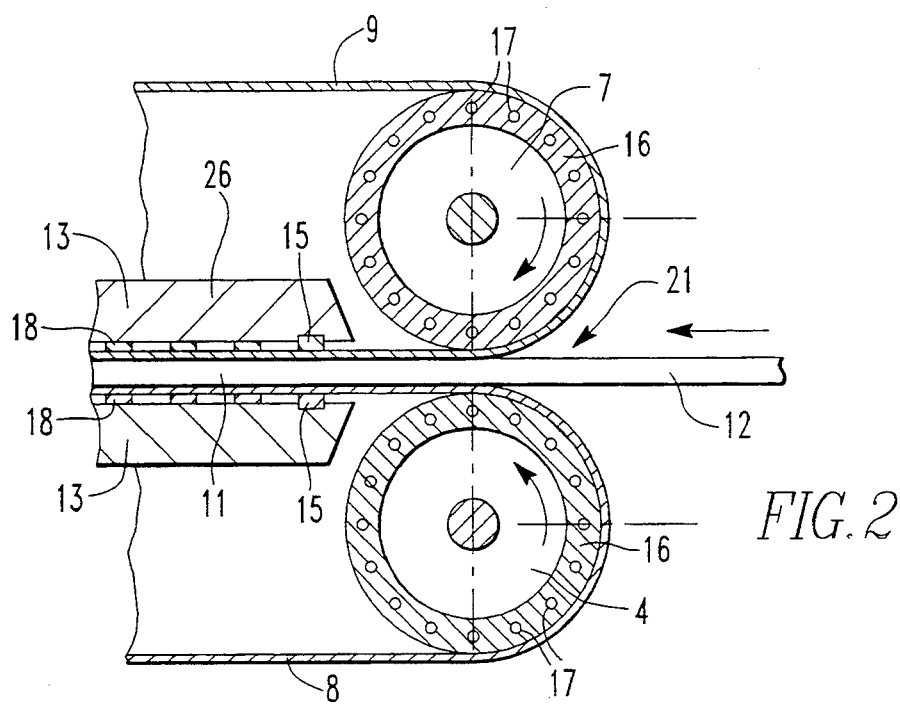
FIG. 2 is a cross-sectional view through the inletregion into the double band press of FIG. 1.
Figure 16:
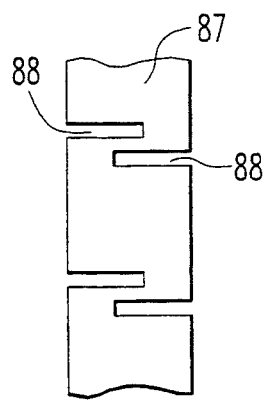
FIG. 16 is a top view of a flexible heat-conducting element for use in the invention.

The heat-conducting elements are preferably arranged to lie opposite each other in the upper and lower pressure plates (see in this connection also FIGS. 2 or 10). Especially when we are dealing with elongated, rod-shaped heat-conducting elements, these are relatively rigid in the longitudinal direction, so that they do not yield in case of thickness irregularities across the press band width, which irregularities are caused by imprecisions in the press bands or also in the commodities to be pressed. This in turn results in increased frictional loads between the press band and the heat-conducting element. In order to be able to compensate for such point-shaped imprecisions, it can be provided that at least one of the heat-conducting elements lying opposite each other is designed to be flexible. In FIG. 16 such a flexible rod-shaped heat-conducting element 87 is shown in more detail in a plan view. This heat-conducting element 87 has indentations 88 on both sides at certain spacings. These indentations 88 diminish the thickness of the heat-conducting element 87 in its longitudinal direction, so that it can flexibly adapt to point shaped thickness irregularities in the lateral direction of the press band 8, 9. This advantageously achieves that no increased loading resulting in destruction of the press band 8, 9 occurs.

In case of particularly steep temperature gradients or in case of long transition zones between the heating zone 54 and the cooling zone 55, one single rod-shaped heat-conducting element can under certain circumstances be insufficient in order to reduce the stresses occurring in the press band. In such a case several rod-shaped heat-conducting elements can be arranged consecutively viewed in the feed direction of the press band in the transition zone.

Such heat-conducting elements serving for reducing stresses in the press band can be arranged inventively in all zones where a temperature gradient occurs. This can especially be the case also in the entry region into the double band press 1, 53, where the cooled press band 8, 9 enters the heating zone 54.

A reduction of the thermal resistance and with this an improved heating or cooling of the press band is achieved with the help of the heat-conducting elements of the invention. By the described advantageous construction of the invention, which reduces stresses as well as avoiding bulges or buckling in the press band, the useful life of the press band is further increased. There thus results the additional advantage that one obtains a material web meeting the required dimension much better than was possible with previous double band presses.

While the invention has been described in connection with preferred embodiments, it will be understood that modifications thereof within the principles outlined above will be evident to those skilled in the art and thus the invention is not limited to the preferred embodiments but is intended to encompass such modifications.

I claim:

1. A continuously operating double band press for fabrication of compression layers, i.e. laminates, chipboard, fiberboard, plywood or the like comprising:

upper and lower endless press bands each conducted over two reversing drums rotatably supported in a rigid press stand, said press bands having upper and lower spaced parallel segments with inner and outer sides; said compression layer being disposed between the upper and lower spaced segments so as to move with said band segments through said press stand, pressure exerting means located on the inner sides of the associated press band segments and including pressure plates fastened in the press stand and engaging respective sides of the press band segments and sealed with respect to the latter in a horizontal direction by respective spaced floating seals and bounding in a vertical direction respective pressure chambers for receiving pressurized fluid medium for forcing said pressure plates toward one another for compressing the compression layer between said band segments while moving through said pressure stand and a plurality of heat-conducting elements including heat transfer means for heating or cooling, said heat-conducting elements being arranged in said pressure chambers and having flexible conduit means extending between said pressure plates and said heat-conducting elements for supplying heat thereto or removing it therefrom to allow direct heating or cooling of the compression layer through the associated press band segments, said heat-conducting elements being individually movably mounted on said pressure plates and spring-biased into engagement with said band segments such that their surfaces are in contact with the inner side of said band segments with predetermined contact pressures, which are independent of the pressure exerted by said pressurized fluid medium, onto said press bands and the inner sides of said associated press band segments slide along said contact surfaces under said predetermined contact pressure for efficiently transferring heat between said compression layer and said heat-conducting elements through said press band segments while moving with said compression layer through said press stand.

2. A double band press according to claim 1, wherein said heat conducting element is cylindrically-shaped, square-shaped, or parallelepiped-like shaped.

3. A double band press according to claim 1, wherein said heat conducting element is substantially prismatically-shaped.

4. A double band press according to claim 1, wherein spring means are provided to press the heat-conducting elements against the press band segments.

5. A double band press according to claim 1, wherein the heating or cooling means comprises bores having a surface in the body of the heat-conducting element and means for flowing a heat carrier agent through the bores.

6. A double band press according to claim 5, wherein the heat carrier agent is a thermal oil.

7. A double band press according to claim 5, further comprising a supply line and an outlet line for the heat carrier agent and connected to the bores, said bores extending up to the surface of the body, means comprising flexible bellows for connecting said supply line and outlet line to supply lines in the pressure plate.

8. A double band press according to claim 1, wherein said heat transfer means are an electrical heating elements located in heat-conducting elements.

9. A double band press according to claim 1, wherein said heat transfer means is a Peltier cell located in the body of the heat conducting element.

10. A double band press according to claim 1, wherein the body of the heat-conducting element comprises a cylindrically-shaped hollow housing, said housing being open at one end spaced from the associated press band and a lid being arranged at said open end, and the heating or cooling means being located inside said housing.

11. A double band press according to claim 10, wherein the pressure plate comprises current-carrying lines coupled with said electrical connectors and said electrical connectors extend in a bellows located between the pressure plate and the said body.

12. A double band press according to claim 8, wherein the heat-conducting element comprises a housing having a ceramic mass having a good heat conductivity, the electric heating coil being completely embedded in said ceramic mass.

13. A double band press according to claim 9, wherein the Peltier cell rests with one face at a base surface of a housing of the heat-conducting element with the base surface in contact with the inner side of the associated press band section.

14. A double band press according to claim 1, wherein said heat conducting element has a hollow interior sealed against the pressure chamber for preventing flow of the fluid medium into said hollow interior.

15. A continuously operating double band press for fabrication of laminates, chipboard, fiberboard, plywood or the like; comprising:
    an upper and a lower endless press band each conducted over two reversing drums rotatably supported in a rigid press stand, each said press band having an inner side and an outer side;
    means to exert pressure on the inner sides of the associated press bands, said pressure exerting means comprising:
    a pressure plate fastened in the press stand and engaging the inner side of the press bands and sealed to the latter in a horizontal direction by floating seals and bounding in a vertical direction pressure chambers wherein pressure is generated by at least one fluid medium;
    heat-conducting elements arranged in the pressure chambers and each including a body within one of the pressure chambers having a surface in contact with the associated inner side of said pressure chamber such that the inner side of the press band slides along said surface;
    the improvement wherein means for heating or cooling are arranged in said body of the heat-conducting element for transferring heat directly between the body and the associated press band; and further comprising:
    a guide plate located in the pressure chamber spaced from the pressure plate and the press band and extending parallel to the pressure plate, said guide plate having throughholes having a larger cross-section than that of the body of the heat-conducting elements, said body of the heat-conducting elements having a circumferential edge at the side facing the pressure plate which is larger than that of the throughhole, each said body being located in one of said throughholes such that the said edge prevents it from falling through the throughhole when a pres band is replaced.

16. A continuously operating double band press for fabrication of laminates, chipboard, fiberboard, plywood or the like comprising:
    an upper and a lower endless press band each conducted over two reversing drums rotatably supported in a rigid press stand, each said press band having an inner side and an outer side;
    means to exert pressure on the inner sides of the associated press bands, said pressure exerting means comprising:
    a pressure plate fastened in the press stand and engaging the inner side of the press bands and sealed to the latter in a horizontal direction by floating seals and bounding in a vertical direction pressure chambers wherein pressure is generated by at least one fluid medium;

heat-conducting elements arranged in the pressure chambers and each including a body within one of the pressure chambers having a surface in contact with the associated inner side of said press band such that the inner side of the press band slides along said surface;

the improvement wherein means for heating or cooling are arranged in said body of the heat-conducting element for transferring heat directly between the body and the associated press band, and further wherein the surface of the body of the heat conducting element facing the inner side of the associated press band has a lattice made up of first horizontally extending flutes extending transversely of second horizontally extending flutes.

17. A double band press according to claim 16, wherein the heat carrier agent is water or mercury.

18. A continuously operating double band press for fabrication of laminates, chipboard, fiberboard, plywood or the like, comprising:

an upper and a lower endless press band each conducted over two reversing drums rotatably supported in a rigid press stand, each said press band having an inner side and an outer side;

means to exert pressure on the inner sides of the associated press bands, said pressure exerting means comprising:

a pressure plate fastened in the press stand and engaging the inner side of the press bands and sealed to the latter in a horizontal direction by floating seals and bounding in a vertical direction pressure chambers wherein pressure is generated by at least one fluid medium;

heat-conducting elements arranged in the pressure chambers and each including a body within one of the pressure chambers having a surface in contact with the associated inner side of said pressure chamber such that the inner side of the press band slides along said surface, the improvement wherein means for heating or cooling are arranged in said body of the heat-conducting element for transferring heat directly between the body and the associated press band, and further wherein the pressure plate is subdivided into a heating plate and a cooling plate to define a heating zone and a cooling zone, said pressure plate having a groove located in the pressure zone between the heating zone and the cooling zone, at least one heat-conducting element being arranged in said groove in contact with the press band such that stresses occurring in the press band in the transition zone are reduced.

19. A double band press according to claim 18, wherein said one heat-conducting element is provided with means for heating or cooling it.

20. A double band press according to claim 18, further comprising spring elements for causing said one heat-conducting element to contact the associated press band.

21. A double band press according to claim 18, wherein said one heat-conducting element has a square, block or rod-shape.

22. A double band press according to claim 21, wherein the said one heat-conducting element has a length lying between the width of the pressure chamber and the width of the press bands.

23. A double band press according to claim 18, wherein said one heat-conducting element has at least one indentation at the side facing the press band, a lug of an S-shaped mounting engaging said indentation and the other end of the S- shaped mounting being fastened to the pressure plate whereby the heat-conducting element is mobile in a vertical direction and guided by the S-shaped mounting.

24. A double band press according to claim 18, wherein said one heat-conducting element comprises a passage for a junction wire, one end of a bellows is fastened at said passage, said junction wire passing through said bellows, the bellows extending in the groove in the pressure plate, the other end of the bellows being fastened at the end of the groove on the side facing away from the press band, the groove discharging at this end into a bore passing through the pressure plate, said discharge bore being closed by means of a plug, the junction wire exiting from the bellows and passing through the plug, and an electrically insulating vitreous mass sealing the point of passage in the plug and the passage for the junction wire.

25. A double band press according to claim 18, wherein additional heat-conducting elements are arrange din zones subject to temperature gradients.

26. A double band press according to claim 18, wherein additional heat-conducting elements are arranged in the inlet zone into the double band press where the press band enters into the heating zone.

27. A double band press according to claim 18, wherein several heat-conducting elements are arranged consecutively in the transition zone viewed in the feed direction of the press band.

28. A continuously operating double band press for fabrication of laminates, chipboard, fiberboard, plywood or the like; comprising:

an upper and lower endless press band each conducted over two reversing drums rotatably supported in a rigid press stand, each said press band having an inner side and an outer side;

means to exert pressure on the inner sides of the associated press bands, said pressure exerting means comprising:

a pressure plate fastened in the press stand and engaging the inner side of the press bands and sealed to the latter in a horizontal direction by floating seals and bounding in a vertical direction pressure chambers wherein pressure is generated by at least one fluid medium;

heat-conducting elements arranged in the pressure chambers and each including a body within one of the pressure chambers having a surface in contact with the associated inner side of said pressure chamber such that the inner side of the press band slides along said surface, the improvement wherein means for heating or cooling are arranged in said body of the heat-conducting element for transferring heat directly between the body and the associated press band, and further wherein the heat-conducting element is rod-shaped and comprises several side indentations to provide flexibility in its longitudinal direction.

* * * * *